United States Patent [19]
DeJaco et al.

[11] Patent Number: 5,894,451
[45] Date of Patent: Apr. 13, 1999

[54] IMPULSIVE SNAP-THROUGH ACOUSTIC PULSE GENERATOR

[75] Inventors: Jerome F. DeJaco; Willard F. Rask, both of San Diego, Calif.

[73] Assignee: The United States of America as represented by the Secretary of the Navy, Washington, D.C.

[21] Appl. No.: 08/955,339

[22] Filed: Oct. 21, 1997

[51] Int. Cl.[6] ............................. G01V 1/38; H01L 41/08
[52] U.S. Cl. ........................... 367/143; 367/174; 181/106
[58] Field of Search ............................. 367/143, 174; 181/106, 110, 120; 175/1; 161/249

[56] References Cited

U.S. PATENT DOCUMENTS

| | | |
|---|---|---|
| 3,258,738 | 6/1966 | Merchant . |
| 3,363,118 | 1/1968 | Sims . |
| 3,382,841 | 5/1968 | Bouyoucos ............................. 367/174 |
| 3,522,862 | 8/1970 | Lister ..................................... 367/143 |
| 3,983,425 | 9/1976 | Barlow . |
| 4,153,134 | 5/1979 | Vang ...................................... 181/120 |
| 4,384,351 | 5/1983 | Pagliarini, Jr. et al. . |
| 4,420,826 | 12/1983 | Marshall, Jr. et al. . |
| 4,524,693 | 6/1985 | McMahon et al. . |
| 4,731,764 | 3/1988 | Ponchaud . |
| 4,739,859 | 4/1988 | Delano .................................. 181/119 |
| 4,878,207 | 10/1989 | Jandera et al. . |
| 4,894,811 | 1/1990 | Porzio . |
| 4,974,216 | 11/1990 | Elliott . |
| 5,016,228 | 5/1991 | Arnold et al. . |
| 5,036,945 | 8/1991 | Hoyle et al. ........................... 181/104 |
| 5,291,461 | 3/1994 | Boeglin et al. . |
| 5,497,357 | 3/1996 | Dahlstrom et al. . |
| 5,515,343 | 5/1996 | Boucher et al. . |

*Primary Examiner*—Nelson Moskowitz
*Attorney, Agent, or Firm*—Harvey Fendelman; Michael A. Kagan; Peter A. Lipovsky

[57] ABSTRACT

An impulsive snap-through acoustic pulse generator may be used to generate an acoustic pulse in an aqueous environment without gas bubbles. The impulsive snap-through acoustic pulse generator includes a support structure having an open end; a resilient shell mounted to the support structure to define a chamber, and a gas vent in fluid communication with the chamber through which a gas passes for changing the pressure in the chamber so that the resilient shell transitions from a first stable state to a second stable state, thereby generating an acoustic pulse.

20 Claims, 6 Drawing Sheets

IMPULSIVE SNAP-THROUGH ACOUSTIC PULSE GENERATOR

BACKGROUND OF THE INVENTION

The present invention generally relates to the field of underwater acoustic pulse generators, and more particularly, to an acoustic pulse generator which employs a resilient shell which generates an acoustic pulse as it transitions between two stable physical states.

Acoustic pulse generators have been used in underwater environments to map underwater geological structures and to locate man-made structures, such as submarines and underwater mines. Several types of acoustic pulse generators such as sparkers, explosives, and air guns use electrical, pneumatic, and/or chemical methods for generating large volume velocities in the surrounding fluid that result in significant impulsive acoustic source levels. All of these types of impulsive sound sources generate sound using oscillating gas bubbles. However, the acoustic characteristics of the pulses are highly dependent on hydrostatic pressure. Moreover, explosives based systems are subject to strict ordnance and safety regulations, which add significantly to the costs for storing, handling, and deploying such systems. Moreover, explosive based systems consume costly expendables.

A need therefore exists for a reliable, efficient, and re-usable system that generates a low frequency, broad-band acoustic pulse having a relatively high amplitude. A further need exists for an acoustic pulse generator that generates acoustic pulses in water without gas bubbles.

SUMMARY OF THE INVENTION

The present invention provides an impulsive snap-through acoustic pulse generator which may be used for generating an acoustic pulse in water without an oscillating gas bubble.

An impulsive snap-through acoustic pulse generator embodying various features of the present invention may be used to generate an acoustic pulse in an aqueous environment without gas bubbles. The impulsive snap-through acoustic pulse generator includes a support structure having an open end; a resilient shell mounted to the support structure to define a chamber, and a gas vent in fluid communication with the chamber through which a gas passes for changing the pressure in the chamber so that the resilient shell transitions from a first stable state to a second stable state, thereby generating an acoustic pulse. Another embodiment of the invention employs two, diametrically opposed resilient shells mounted to each end of the support structure.

In yet another embodiment, an actuating cylinder may be mounted in the chamber so that extension of the actuator causes the resilient shell to be pushed from one stable state to another. The actuator may be hydraulically or pneumatically operated.

BRIEF DESCRIPTION OF THE DRAWINGS

Throughout the several views, like elements are referenced using like references.

DESCRIPTION OF THE PREFERRED EMBODIMENT

Figure 1:
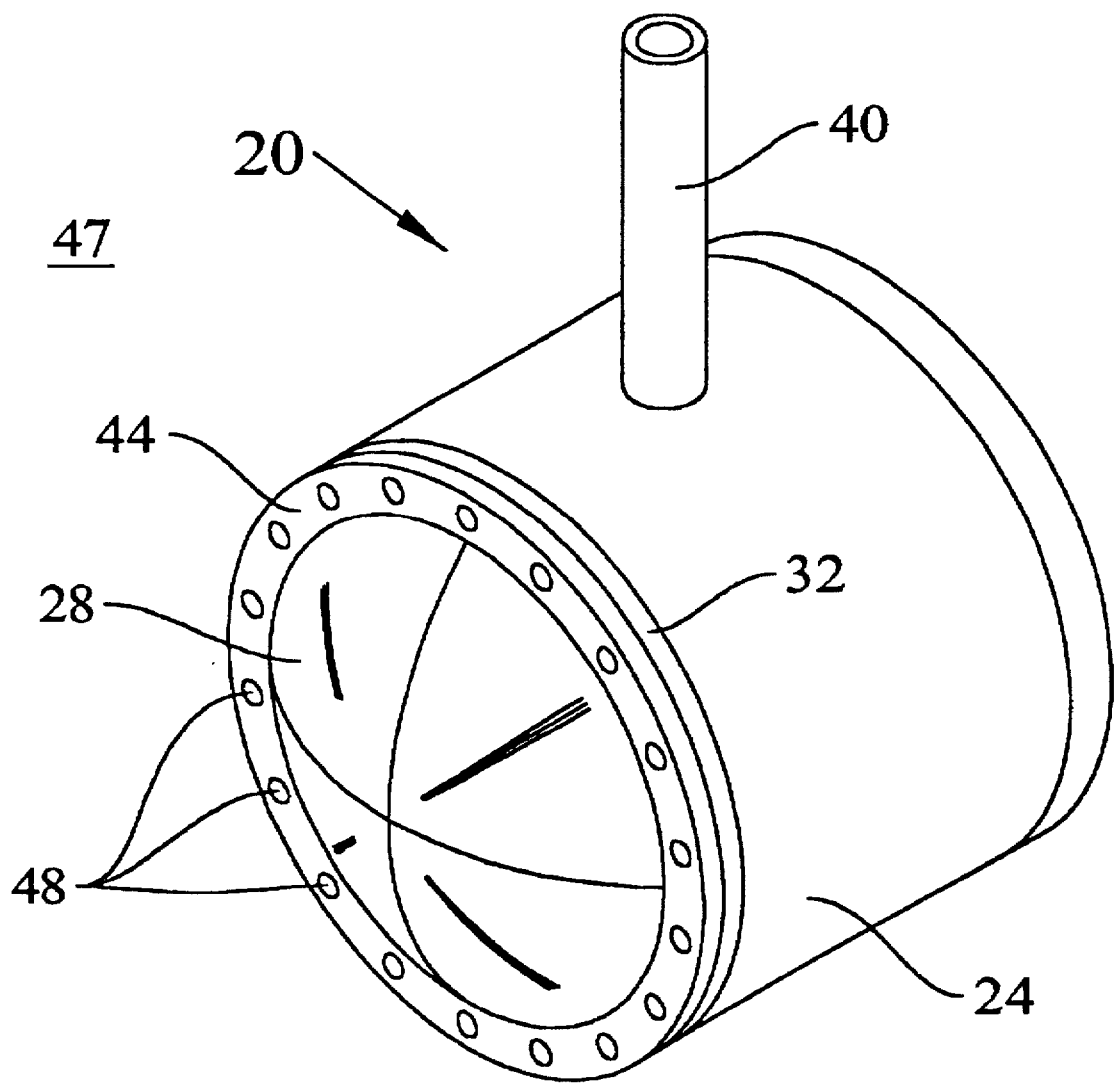
FIG. 1 is a perspective view of an impulsive snap-through acoustic pulse generator embodying various features of the present invention in which the resilient shell is in an extended stable state.
Figure 2:
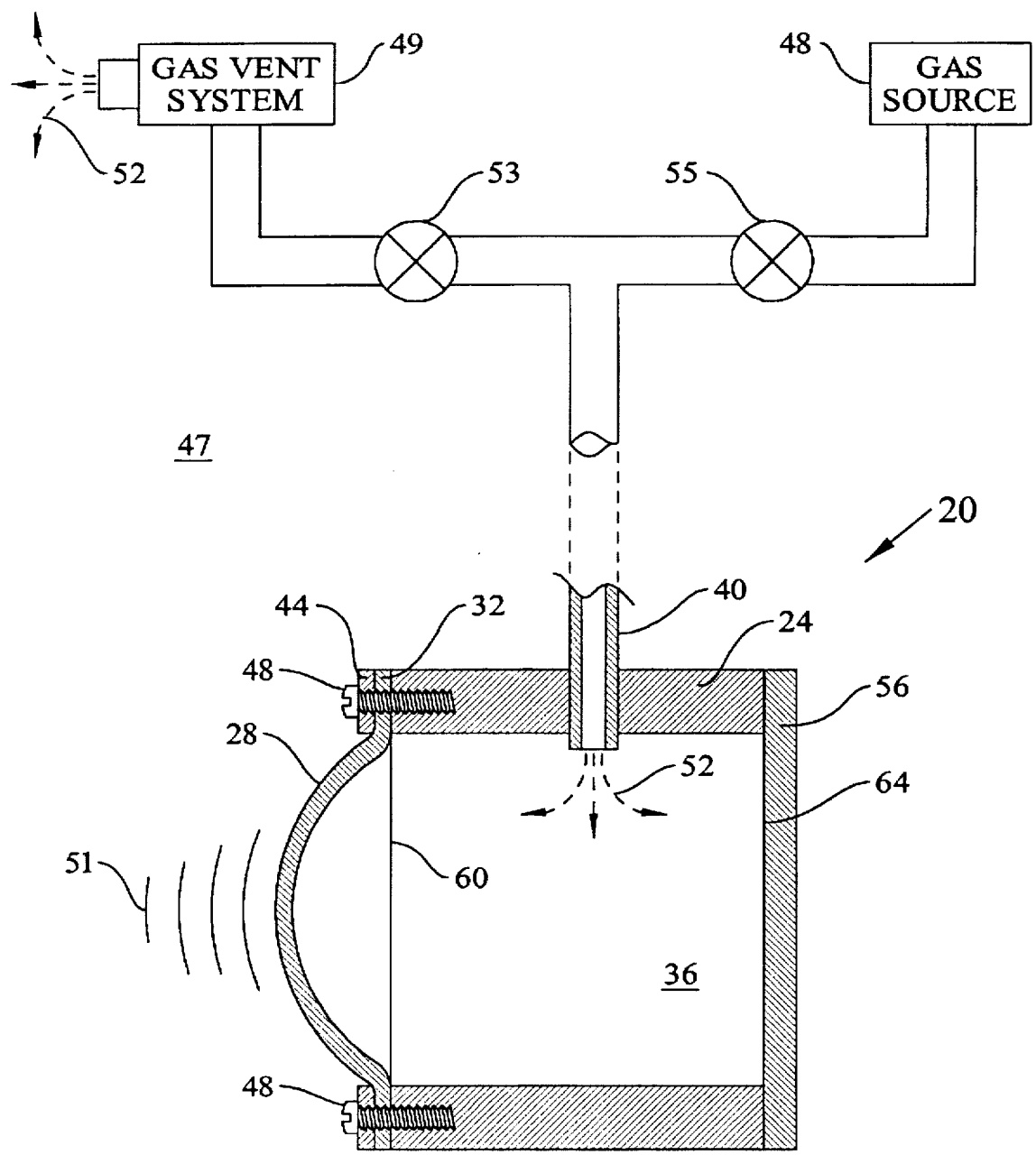
FIG. 2 is a cross-sectional view of the impulsive snap-through acoustic pulse generator of FIG. 1.

Referring to FIGS. 1 and 2, there is shown an impulsive snap-through acoustic pulse generator 20 which includes a support structure 24, a resilient shell 28 mounted to the support structure 24 to create a chamber 36, a pipe 40 mounted through the support structure to provide fluid communication with the chamber 36, and a metal ring 44, which may be made of stainless steel. Resilient shell 28 includes an annular flange 32 that rests against the support structure 24. The metal ring 44 fits over the flange 32 and is fastened to the support structure 24 by bolts 48 to create a fluid tight seal between the shell 28 and the support structure 24. An important characteristic of the resilient shell 28 is that it has two alternative stable physical states and may be selectively controlled to transition between them by controlling the pressure $P_1$ in chamber 36 with respect to the pressure, $P_{Env}$, of the environment 47 in which the generator 20 is immersed. The pressure $P_1$ may preferably be held to near vacuum levels, as for example, $7 \times 10^{-4}$ Torr. However, it is to be understood that $P_1$, may be established at other levels to suit the requirements of a particular application, where $P_{Env} > P_1$.

Figure 3:
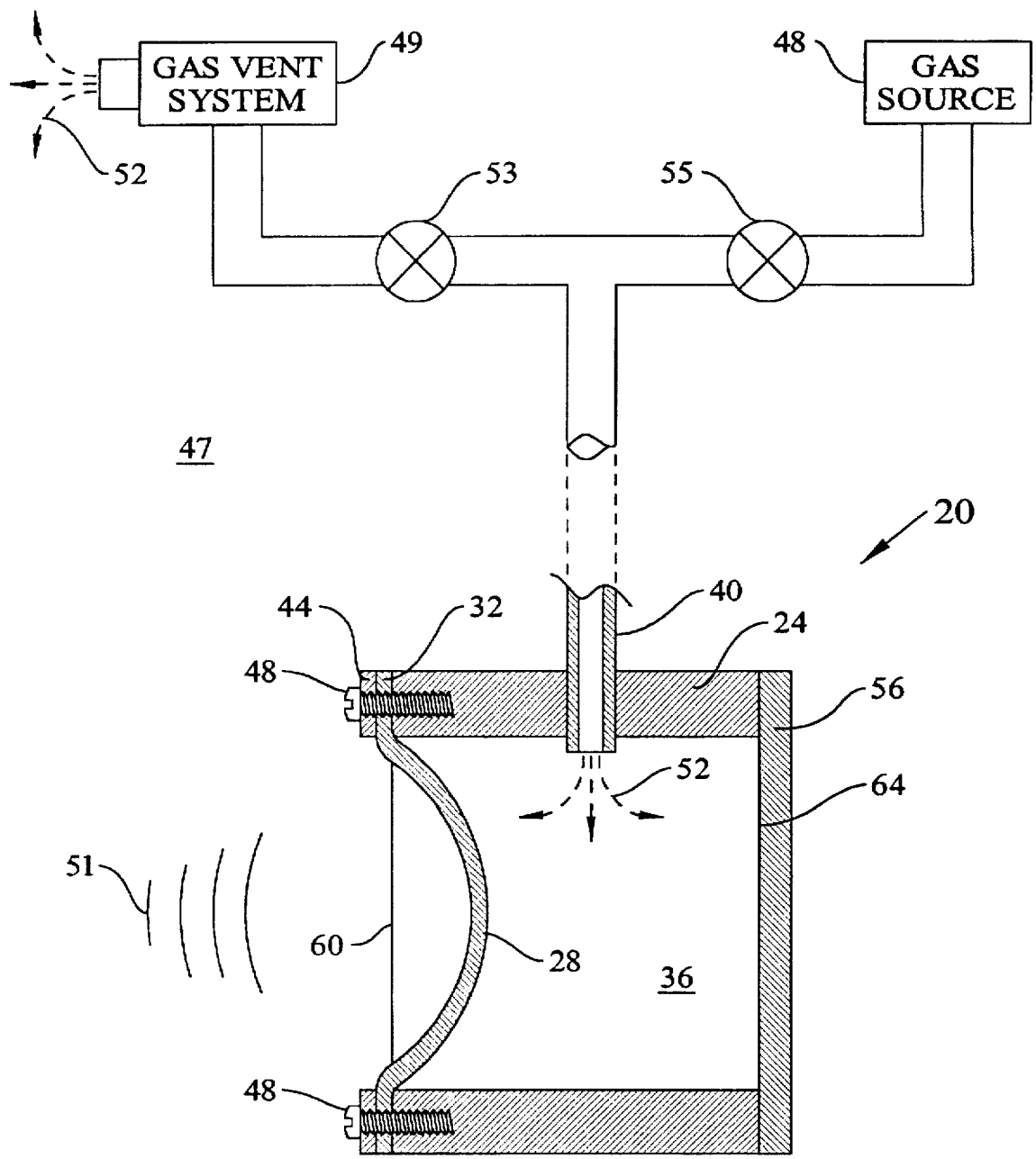
FIG. 3 is a cross-sectional view of the impulsive snap-through acoustic pulse generator of FIG. 1 in which the resilient shell is in a "snapped-in" stable state.

FIGS. 1 and 2 show the resilient shell 28 in an extended, first stable state. FIG. 3 shows the resilient shell 28 in a second stable, or "snapped-in" state. Referring to FIG. 2, a gas source 48 is connected in fluid communication with the chamber 36 by pipe 40 and provides gas 52 through the pipe 40 for pressurizing the chamber 36. Sufficient pressure, $P_1$, may be used to force resilient shell 28 to transition to the extended stable state, and thereby generate an acoustic pulse 51 in environment 47 in which the generator 20 is immersed. A gas vent system 49, such as a vacuum pump, is also connected to the pipe 40 through which gas 52 may be exhausted from the chamber 36. If the pressure ratio, $P_{Env}/P_1$ is sufficient, as for example, by exhausting gas 52 from chamber 36 when acoustic pulse generator is immersed at sufficient depth in an aqueous environment, such as the ocean, resilient shell 28 is forced to transition from the extended state to the "snapped-in" state. An acoustic pulse 51 is generated in the environment 47 during such a transition.

Valve 53 is connected in line with pipe 40 between gas vent system 49 and support structure 24, and valve 55 is connected in-line with pipe 40 between gas source 48 and support structure 24. When valve 53 is closed and valve 55 is opened, gas vent system 49 is isolated from chamber 36 so that gas 52 from gas source 48 may be introduced into chamber 36 to pressurize the chamber. Gas pressure within chamber 36 may be reduced when valve 53 is opened and valve 55 is closed so that gas 52 may be exhausted through gas vent system 49.

The resilient shell 28 is a structure having two stable physical states and may include a curved surface such as may be found on the surface of a spheroid or ellipsoid. Resilient shell 28 may be made of materials selected from the group that essentially includes polyurethane, steel, fiberglass, polycarbonate, polypropylene, and fiber filled composites. The support structure 24 may be fabricated from a cylinder having ends 60 and 64 which may be made of materials such as stainless steel, aluminum, or fiber filled composites. An end plate 56 may be welded or otherwise fastened to the end 64 of the support structure 24 to provide a waterproof and gas tight seal between the end plate 56 and support structure 24.

Figure 4:
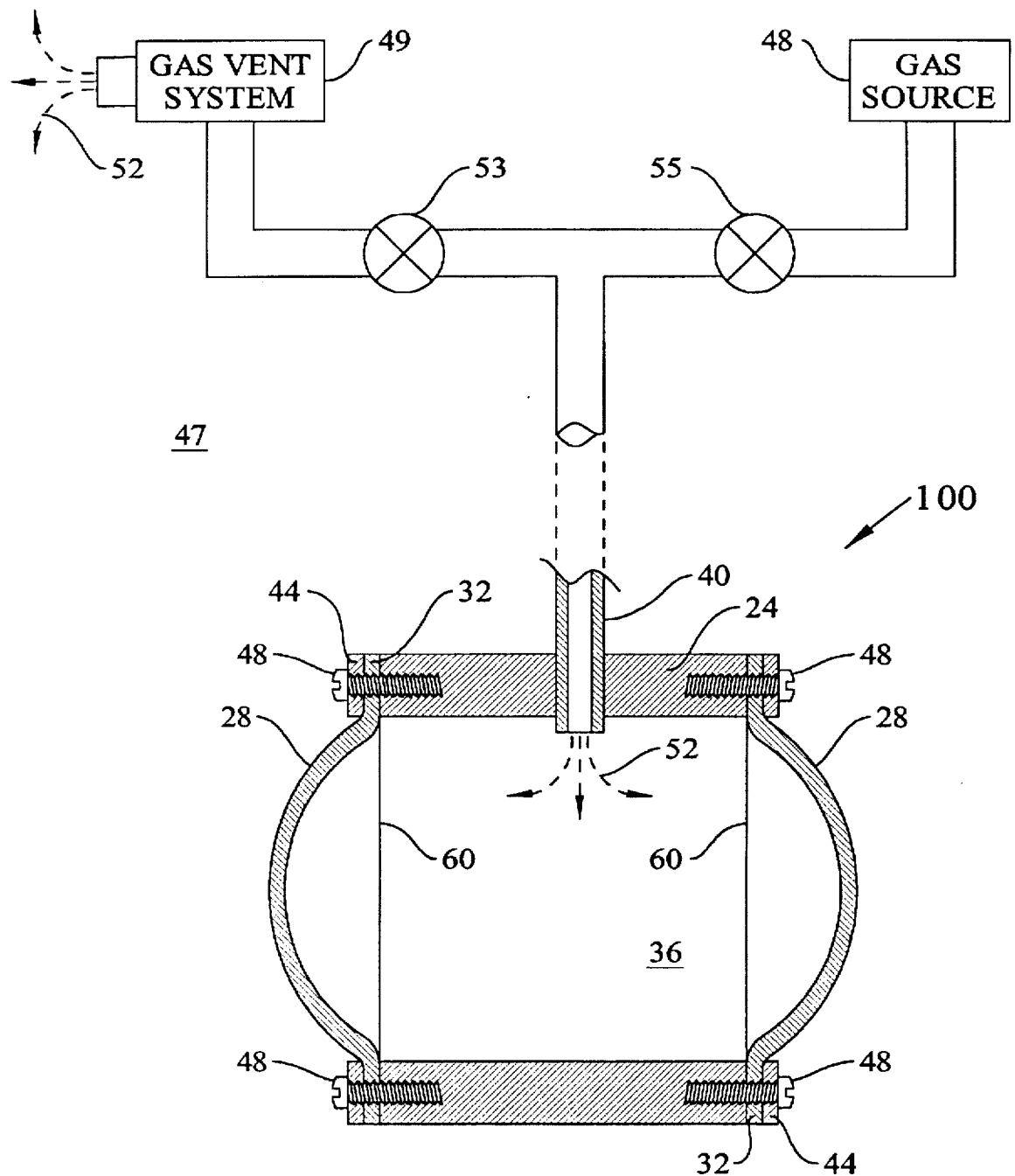
FIG. 4 shows an acoustic pulse generator which includes two diametrically opposed resilient shells.

Another embodiment of an acoustic pulse generator 100 embodying various features of the present invention, shown in FIG. 4, is similar to acoustic pule generator 20. However, acoustic pulse generator 100 includes two resilient shells 28 instead of one as shown in FIGS. 1 and 2. In FIG. 4, a resilient shell 28 is mounted each of opposed ends 60 and 64 of support structure 24 to define chamber 36. Metal rings 44 are fitted over the flanges 32 of shells 28 and are secured by bolts 48 to support structure 24 to form a gas-tight and fluid tight seal between the resilient shells 24 at each of ends 60 and 64 of the support structure 24. The use of two diametrically opposed resilient shells 24 provides the acoustic pulse generator 100 with balanced forces when the shells transition from one stable state to another, as well as more acoustic energy per pulse cycle compared to the energy generated when a single resilient shell 24 transitions from one stable state to another. A pulse cycle refers to the transition of one or more resilient shells 28 from one state to another, i.e., from a "snapped-in" state to an extended state, or from an extended state to a "snapped-in state."

Figure 5:
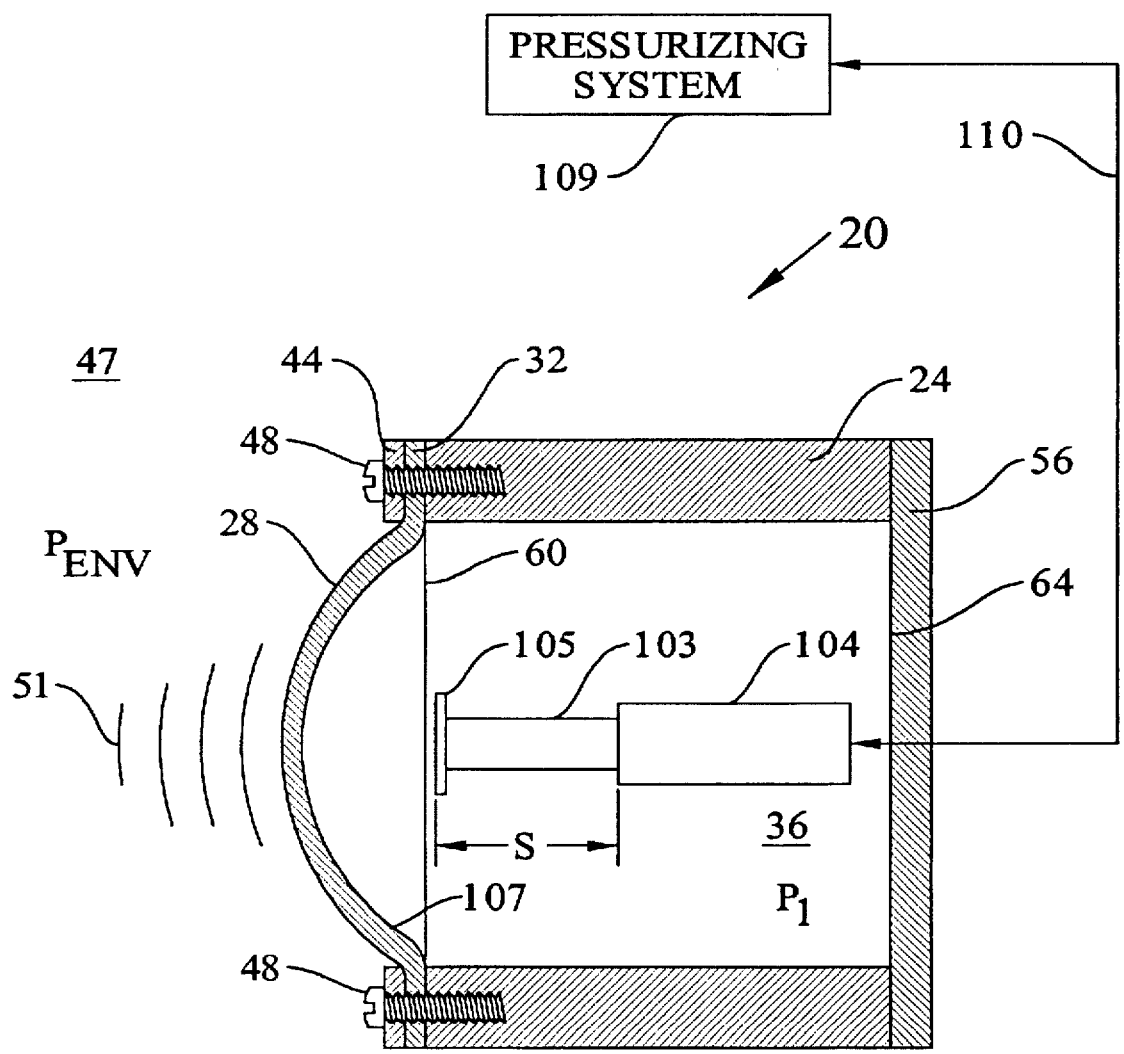
FIG. 5 shows an acoustic pulse generator which uses a piston actuator to extend the resilient shell.
Figure 6:
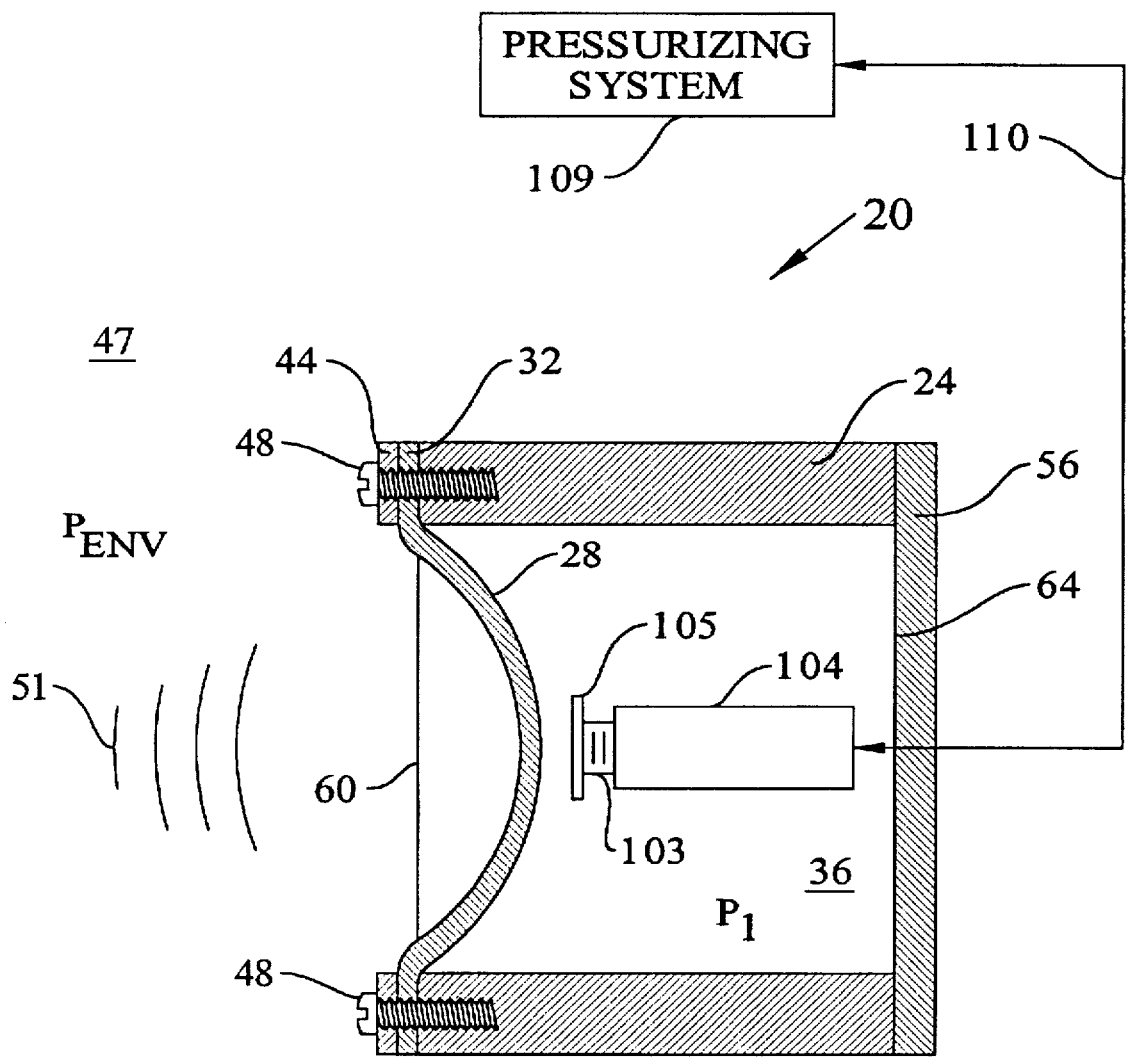
FIG. 6 shows the acoustic pulse generator of FIG. 5 wherein the piston actuator is retracted.

FIG. 5 shows an acoustic pulse generator 100 which includes a piston actuator 102 mounted to the end plate 56 and a piston driver 104. The piston actuator 104 includes an actuation rod 103 and a blunt cap 105 mounted to the end of the rod 103. The blunt cap 105 is shaped to conform to the inner surface 107 of the resilient shell 28 so that when the piston actuator 104 is activated, the piston rod 103 is extended so that the blunt end 105 generally contacts the geometric center of inner surface 107, thereby forcing the resilient shell 28 to transition from a "snapped-in" state to an extended state. When the piston is extended the full length of its stroke, S, the resilient shell 28 is fully extended as shown in FIG. 5. However, when the piston rod 103 of piston actuator 104 is retracted, as shown in FIG. 6, and the pressure ratio $P_{Env}/P_1$ is sufficient, resilient shell 28 is forced into the "snapped-in" state. The piston actuator 102 may be either double or single acting, and may be hydraulically or pneumatically actuated by a pressuring system 109. The pressurizing system 109 provides fluid to and receives fluid from piston actuator 104 via fluid line 110. Such fluid may be gas if pressurizing system 109 is a pneumatic system, or hydraulic fluid if pressurizing system 109 is a hydraulic system. The pressure $P_1$ in chamber 36 may be established at a fixed level, where $P_{Env} > P_1$. The pressurizing system 109 provides fluid to pressurize and extend piston actuator 104 which causes resilient shell 28 to transition from a snapped-in state to an extended state, and receives fluid from piston actuator 104 so that the piston rod 103 retracts. Retracting the piston rod 103 causes resilient shell 28 to transition from the extended state to the snapped-in state.

Obviously, many modifications and variations of the present invention are possible in light of the above teachings. It is therefore to be understood that within the scope of the appended claims, the invention may be practiced otherwise than as specifically described.

We claim:

1. An impulsive snap-through acoustic pulse generator for generating an acoustic pulse in an environment, comprising:

a support structure having a volume bounded by an open end;

a resilient shell mounted over said open end of said support structure to define a chamber, and having alternative first and second physical states, wherein said first physical state said resilient shell is convex with respect to said environment, and in said second physical state said resilient shell is concave with respect to said environment; and a fluid passage in fluid communication with said chamber for transferring fluid to and from said chamber so that said resilient shell transitions between said first state and said second state and thereby generates said acoustic pulse.

2. The impulsive snap-through acoustic pulse generator of claim 1 wherein said resilient shell is made from a material selected from the group consisting essentially of urethane, steel, fiberglass, fiber filled composite, and rubber.

3. The impulsive snap-through acoustic pulse generator of claim 1 wherein said resilient shell has a curved surface region.

4. The impulsive snap-through acoustic pulse generator of claim 1 wherein said resilient shell has a substantially spherically shaped surface region.

5. The impulsive snap-through acoustic pulse generator of claim 1 wherein said resilient shell has a substantially ellipsoidally shaped surface region.

6. The impulsive snap-through acoustic pulse generator of claim 1 wherein said support structure includes:

a cylinder having first and second open ends; and an end plate mounted in a gas tight manner to said first end of said cylinder.

7. The impulsive snap-through acoustic pulse generator of claim 1 further including a gas source for providing gas to pressurize said chamber.

8. The impulsive snap-through acoustic pulse generator of claim 7 further including a gas vent system for exhausting gas from said chamber.

9. An impulsive snap-through acoustic pulse generator for generating an acoustic pulse, comprising:

a support structure having first and second open ends;

a first resilient shell mounted to said support structure at said first open end and having alternative first and second stable physical states;

a second resilient shell mounted to said support structure at said second open end and having alternative third and fourth stable physical states, whereby said first and second resilient shells, and said support structure define a chamber; and a gas vent in fluid communication with said chamber through which a gas passes for changing the pressure in said chamber so that said resilient shell transitions from a first stable state to a second stable state and thereby generates an acoustic pulse.

10. The impulsive snap-through acoustic pulse generator of claim 9 wherein said first and second resilient shells are each made from a material selected from the group that essentially includes urethane, steel, fiber filled composite, polypropylene, fiberglass, and rubber.

11. The impulsive snap-through acoustic pulse generator of claim 9 wherein said first and second resilient shells each have a curved surface region.

12. The impulsive snap-through acoustic pulse generator of claim 9 wherein said first and second resilient shells each have a substantially spherically shaped surface region.

13. The impulsive snap-through acoustic pulse generator of claim 9 wherein said first and second resilient shells each have a substantially ellipsoidally shaped surface region.

14. The impulsive snap-through acoustic pulse generator of claim 9 further including a gas source for providing gas to pressurize said chamber.

15. The impulsive snap-through acoustic pulse generator of claim 14 further including a gas vent system for exhausting gas from said chamber.

16. An impulsive snap-through acoustic pulse generator for generating an acoustic pulse in an environment, comprising:

a support structure having a volume bounded by an open end;

a resilient shell mounted over said open end of said support structure to create a chamber, and having alternative first and second physical states, wherein said first physical state said resilient shell is convex with respect to said environment, and in said second physical state said resilient shell is concave with respect to said environment and said acoustic pulse is generated when said resilient shell transitions between said first and second physical states; and a piston actuator mounted in said chamber for forcing said resilient shell to transition from said second physical state to said first physical state when said piston actuator is extended.

17. The impulsive snap-through acoustic pulse generator of claim 16 further including a pressurizing system for providing fluid to pressurize said piston actuator so that piston actuator extends and causes said resilient shell to transition from said second physical state to said first physical state, and for receiving fluid from said piston actuator.

18. The impulsive snap-through acoustic pulse generator of claim 17 wherein said fluid is a gas.

19. The impulsive snap-through acoustic pulse generator of claim 17 wherein said fluid is a liquid.

20. The impulsive snap-through acoustic pulse generator of claim 1 further including a pressurizing system for providing a fluid through said fluid passage to pressurize said chamber so that said resilient shell transitions from said second physical state to said first physical state, and for receiving said fluid from said chamber through said fluid passage to depressurize said chamber.

* * * * *